United States Patent [19]
Suzuki et al.

[11] Patent Number: 5,110,648
[45] Date of Patent: May 5, 1992

[54] OPTICAL STORAGE MEDIUM

[75] Inventors: Masa-aki Suzuki, Neyagawa; Eiji Ando, Katano, both of Japan

[73] Assignee: Matsushita Electric Industrial Co., Ltd., Osaka, Japan

[21] Appl. No.: 456,371

[22] Filed: Dec. 26, 1989

[30] Foreign Application Priority Data

Jan. 10, 1989 [JP] Japan .................................. 1-003101

[51] Int. Cl.$^5$ .............................................. B32B 3/00
[52] U.S. Cl. ........................................ 428/64; 428/65; 428/426; 428/411.1; 428/913; 346/76 L; 346/135.1
[58] Field of Search ................ 428/64, 65, 426, 411.1, 428/913; 346/76 L, 135.1

[56] References Cited

U.S. PATENT DOCUMENTS 4,913,948  4/1990  Ando et al. .......................... 428/64

Primary Examiner—Patrick J. Ryan
Assistant Examiner—Elizabeth Evans
Attorney, Agent, or Firm—Stevens, Davis, Miller & Mosher

[57] ABSTRACT

An optical storage medium comprising a recording layer containing organic dye molecules which allows recording due to change in the molecular structure or molecular aggregate structure induced by irradiation with light, and a stable controlling layer formed on the recording layer, which controlling layer is stable against the irradiation by the lights for recording or reading out. A multi-frequency optical storage medium comprises a plurality of a combination of the recording layers and the controlling layer as a separating layer.

4 Claims, 2 Drawing Sheets

OPTICAL STORAGE MEDIUM

BACKGROUND OF THE INVENTION

The present invention relates to an optical storage medium which is capable of performing optical read and write of information by using an organic dye.

As one system for optical recording using a thin film of an organic dye as recording medium, there has been proposed a recording system comprising an optical storage medium which makes use of J aggregation of a dye, as for example, Japanese Patent Application Kokai (Laid-Open) No. 205187/86.

J aggregation is specified by the fact that it shows an absorption spectrum with a sharp peak, namely a harrow half-width of peak wavelength in the aggregate state of dye, and helps to enhance the wavelength selectivity of recording layer.

The principle of the recording mode with the optical recording medium is such that the medium is exothermally heated by irradiating with a laser beam having an oscillation wavelength corresponding to the peak absorption of the medium to allow the medium to absorb the beam, whereby certain thermal modes are caused in the heated medium resulting in variation in structure of the medium which affords an extinction or diminution of corresponding peak signals. Thus, the produced variations in the absorbance can be stored as signals. Furthermore, for effecting the high-density recording of information by the optical recording technique using the above recording mode, a multi-frequency recording system is disclosed in U.S. Pat. No. 4,737,427, in which a multiple-bit information is recorded in a single recording site by making use of a plurality of dyes differing in maximum absorption wavelength.

An optical storage medium which makes use of the aggregation of dye molecules has high recording sensitivity and is capable of making recording with a small recording energy because of a large $\gamma$ value ("$\gamma$ value" referred to herein designates, for example, the gradient of substantially straight-line section of the recording characteristic curve representing the change of absorbance in relation to applied energy as shown in FIG. 3) and a small recording threshold value. However, since this medium is so sensitive to even a slight variation in the recording energy due to the large $\gamma$ value that it undergoes a change to a large extent with a slight fluctuation of the recording laser beam, or in the optical system, many deviations from the normal rate of variation in the absorbance of the medium tend to be caused at the time of recording, which results in an instability in recording. There are still other problems at the time of reading out the recorded information, wherein the energies of the lights used tend to cause unintended recordings in the medium due to the small recording threshold value which readily results in a change in the storage state or disappearance thereof, that is, in a loss of recorded information.

In conventional optical storage media, the recording sensitivity characteristic determining the performance of the medium has been decided by the dye material itself and could not be controlled by the constitution of the storage medium.

SUMMARY OF THE INVENTION

It is an object of the present invention to provide an optical storage medium which utilizes a method for controlling recording sensitivity of optical storage media by forming a controlling layer having no absorbing region for both recording light and reading light and stable against change of molecular structure or change of molecular aggregate structure, which layer is formed on a recording layer containing an organic dye whose molecular structure or molecular aggregate structure is caused to change by light to effect recording.

It is another object of the present invention to provide a high-density optical storage medium of multi-frequency optical storage system by laminating separated recording layers containing dyes which differ in their absorption maximum wavelengths, with the utilization of the controlling layer of this invention as a separating layer.

Figure 1:
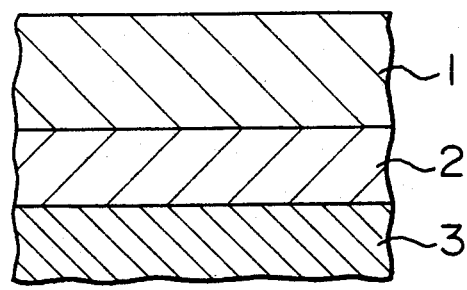
FIG. 1 is a sectional view of an optical storage medium produced according to a production method in an embodiment of this invention.

The following nomenclature is used in the drawings: 1: controlling layer, 2: recording layer, 3: substrate, 4: recording characteristics of a conventional optical storage medium, 5: recording characteristics of an optical storage medium according to this invention, 6: reading light energy, 7: controlling layer B, 8: recording layer B, 9: controlling layer A, and 10: recording layer A.

DETAILED DESCRIPTION OF THE INVENTION

In the optical storage medium produced according to this invention, a change is caused to take place in the molecular structure or molecular aggregate structure of an organic dye by heat mode induced by absorption of irradiated light, and recording is made by making use of such a structural change. Particularly when the recording is made by making use of a transfer of molecular aggregate structure in the thin film of organic dye from a J aggregate structure to a monomer structure, this system is advantageous for conducting a multi-frequency recording since the sharp absorption peak of J aggregation can be utilized.

In this system, said structural change is controlled by a structurally stable controlling layer formed on the recording layer. In other words, recording sensitivity characteristic in relation to recording energy of the recording layer is controlled to reduce the $\gamma$ value. This can minimize the scatter in the rate of change of absorbance relative to the change of recording energy, making it possible to perform stable recording. In addition, as it is possible to control recording threshold value, read-out can be accomplished with no risk of causing erroneous recording by reading light on the occasion of read-out of recorded information.

It is also possible to control recording characteristics by changing light absorption, however, the loss of quantity of light constituting information signal increases, and also recording efficiency is deteriorated according to the method.

The recording layer in accordance with this invention is of the type in which recording is made by making use of its structural change, and the controlling layer has the function to control the structural change of said recording layer which is facilitated by the structural stability of the materials composing the controlling layer. That is, any controlling by light absorption is not intended in the present invention. As materials for fabricating the controlling layer, therefore, those exhibiting no absorption in the region of wavelengths which are absorbed by the recording layer should be selected. More preferably, such materials as having no absorption in the region from visible light to near infrared should be selected.

In production of the controlling layer of the present invention, the materials used therefor are required to have a structural stability and a method capable of producing a densely packed structure with organic molecules is suitable. The Langmuir-Blodgett method is preferred.

Moreover, in an embodiment of the optical recording medium according to the present invention, the controlling layer on the recording layer may be used as a separating layer and an additional recording layer comprising a dye having a maximum absorption in different wavelengths than those of the former recording layer may be laminated on the controlling layer to provide an optical high-density recording medium of a multi-frequency recording mode.

The present invention will be described more particularly below by showing Examples thereof with reference to the accompanying drawings.

The Langmuir-Blodgett method (LB method) was used for forming the recording layer and controlling layer in the Examples described below. The LB method is a low-temperature process for forming thin films. This method enables control of thickness of very thin films to the extent of monomolecular films, and its controlling accuracy is high, so that this method is used predominantly in the field of optical storage media to which the present invention relates. The technique for forming the recording and controlling layers is not limited to the LB method, but may be any of other methods such as spin coating. In order to manifest the advantages of the present invention in the controlling layer, however, the LB method is preferred for forming the controlling layer as well as the recording layer in view of the continuity of processes matched with the production of the controlling layer.

EXAMPLE 1

Figure 2:
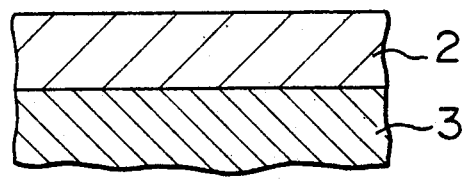
FIG. 2 is a sectional view of a conventional optical storage medium.

An embodiment of the present invention will be described while referring to FIGS. 1, 2 and 3. FIG. 1 shows a structural schema of an optical storage medium fabricated according to the method of this invention, and FIG. 2 shows the structure of a conventional optical storage medium. The recording layer in the storage medium according to this invention is a built-up film made of an organic dye forming J aggregation.

Examples of the organic dyes having said characteristics and usable in this invention are cyanine dyes, merocyanine dyes and squarylium dyes.

These organic dyes are characterized by forming J aggregation, one of association structures with molecules which can be subjected to variations in the molecular structure itself such as deterioration of cleavages or creases in the structure such as disintegration in accordance with a thermal mode in the aggregation induced by light absorption, which variations are preserved as recordings. The controlling layer for controlling the recording sensitivity according to the present invention is formed with organic compounds such as fatty acids, fatty acid esters, fatty acid metal salts, aliphatic amide, aliphatic alcohols, or acrylic polymers. Particularly, molecules to which the LB method can apply are selected. The organic compounds to be used include fatty acids such as palmitic acid, stearic acid, eicosanic acid, and behenic acid; fatty acid esters such as methyl and ethyl esters of the aforementioned acids; and fatty acid metal salts such as salts of the aforementioned acids with divalent metallic ions such as barium, cadmium and calcium. Aliphatic amides and aliphatic alcohols to be used include stearyl amide and stearyl alcohol. Acrylic polymers to be used include polymethylmethacrylates. These organic compounds have no absorption in the region of wavelength from visible light to near infrared (about 400 nm to about 1.5 μm). The controlling layer may be selected from compositions comprising one or a mixture of two of the aforementioned organic compounds, though in Examples the effect of the present invention could be achieved with single component organic compositions. Alternatively, the use of inorganic compounds may be contemplated for the controlling layer. With inorganic compounds, however, a high-temperature process is often required for the formation of the controlling layer, which is difficult to apply to the formation on the recording layer comprising organic dyes.

A process for producing actual recording and controlling layers by the LB method will be demonstrated below. The LB method was conducted with a water trough of 500 mm long × 150 mm wide × 100 mm deep having surfaces coated with Teflon under a controlled surface pressure by the Wilhelmy balancing system.

A synthetic quartz was used as an optical substrate.

A recording layer was fabricated with an organic dye, DYE-A cyanine dye represented by the following structural formula:

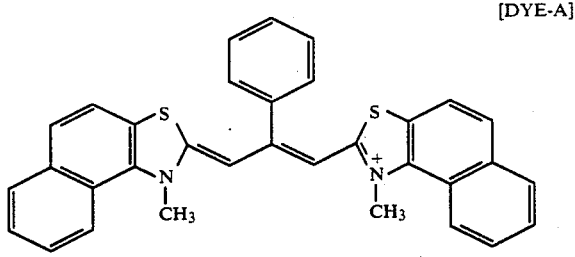

[DYE-A]

Fabrication conditions for the LB recording layer were as follows:

| | |
|---|---|
| Composition | DYE-A/eicosanic acid = 1/2 |
| Sample solution | Mixture of the components in a chloroform solvent in the following concentrations: |
| | DYE-A, 1 mmol/liter |
| | Eicosanic acid, 2 mmol/liter |
| Aqueous phase (subphase) | Distilled water, pH 5.5, 16° C. |
| Surface pressure | 25 mN/m |
| Deposition speed | 10 mm/min |
| Number of deposited layers | 6 layers |

The layers comprising DYE-A cyanine dye fabricated under the conditions as indicated above had an absorption peak in a wavelength of 700 nm due to the J aggregation. Recording onto the cyanine dye recording layers having the J aggregation formed are conducted by structural variation associated with disappearance or disintegration of the J aggregation of cyanine dye molecules in accordance with the thermal mode caused by light absorption.

Fabrication conditions for the LB controlling layer are indicated hereinbelow. After fabricating a recording layer, a controlling layer was sequentially formed. The indicated conditions enabled formation of the LB film of cadmium eicosanate:

| | |
|---|---|
| Composition | Eicosanic acid |
| Sample solution | Dissolution of chloroform solvent in the following concentrations: Eicosanic acid, 1 mmol/liter |
| Aqueous phase (subphase) | Aqueous solution of cadmium chloride $(1 \times 10^{-4}$ mol/liter), pH 6, 20° C. |
| Surface pressure | 30 mN/m |
| Deposition speed | 10 mm/min |
| Number of deposited layers | 20 layers |

The controlling layers having a structural stability composed of the cadmium eicosanate LB film suppress the structural variation of the recording layers to change their characteristics. The recording characteristics may be determined by the film thickness, type of material and fabrication conditions for the controlling layer.

The optical storage media of the conventional structure are generally made by forming a recording layer 2 on an optical substrate 3 by the LB method as shown in FIG. 2. The recording characteristics of the conventional optical storage medium having the structure shown in FIG. 2 are represented by curve 4 in the graph of FIG. 3.

The optical storage medium of this invention shown in FIG. 1 is of a structure in which controlling layer 1 is formed on the storage medium of FIG. 2 by the LB method.

Figure 3:
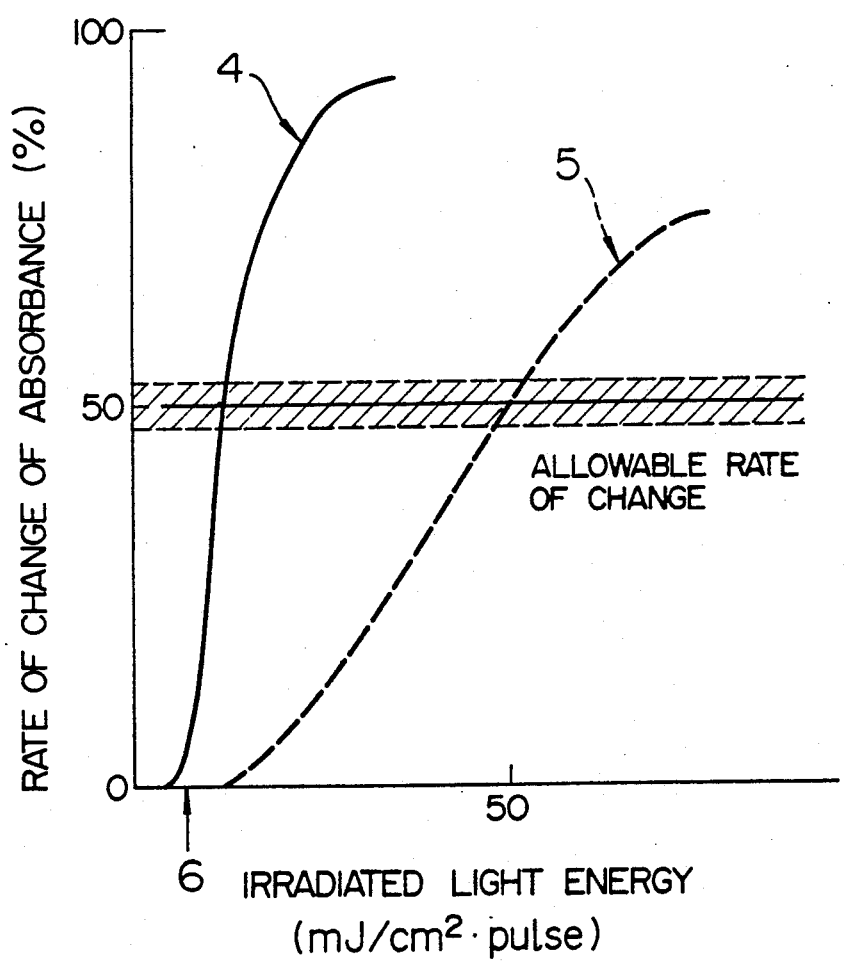
FIG. 3 is a graph showing recording characteristics of an optical storage medium according to this invention and those of a conventional optical storage medium.

The recording characteristics of the optical storage medium according to this invention are represented by curve 5 in the graph of FIG. 3.

A method for determining the recording sensitivity of the optical recording medium will be explained. The recording medium was irradiated with a laser beam of an oscillation wavelength of 700 nm from a dye laser excited by oscillation wavelength of 700 nm from a dye laser excited by Excimer laser as a light source. The recording energy was controlled with the energy of the laser output. The absorbance of the medium was measured before and after irradiation with the laser for each radiation energy, and the recording characteristics were obtained from the resulting rate of variation in absorbance.

As seen from the recording characteristics curves 4 and 5 in the graph of FIG. 3, the gradient of the curve indicating $\gamma$ value of said characteristics is reduced by use of the structure according to the present invention. Therefore, assuming that the change of absorbance at the time of recording is 50%, the range of light energy allowed to be applied within the permissible rate of change in absorbance of $\pm 3\%$ is approximately 1 mJ/cm². pulse in the case of the conventional recording characteristics curve 4, while said range is approximately 4 mJ/cm². pulse in the case of the recording characteristics curve 5 according to this invention. It is thus possible with the optical storage medium of this invention to lessen the change of absorbance due to a slight variation of recording light energy as observed in the conventional storage media and thereby to perform stable recording.

In the optical storage media of the conventional structure, as seen from recording characteristics curve 4 in the graph of FIG. 3, absorbance of the recording layer is changed by the energy of reading light (indicated by 6) to cause disappearance of information. However, the structure according to this invention, as evidenced by recording characteristics curve 5, is capable of preventing any change of absorbance by reading light energy and can provide an optical storage medium which is capable of stable readout.

EXAMPLE 2

Figure 4:
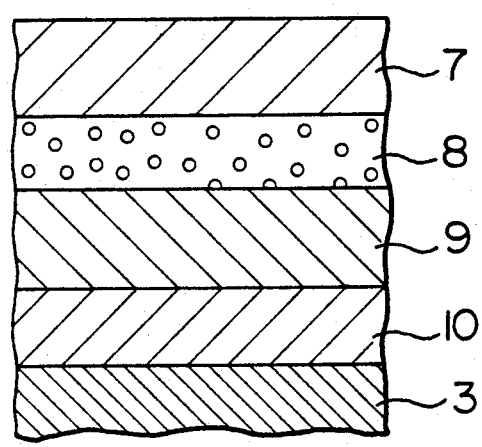
FIG. 4 is a sectional view of a multi-frequency optical storage medium fabricated according to a production method embodying the present invention.

Another embodiment of this invention is described here with reference to FIG. 4.

In a multi-frequency recording, crosstalk between the recording layers is a matter of serious concern. The term "crosstalk" referred to herein signifies the following two phenomena which may occur when two or more recording layers are formed in a storage medium: (1) When recording light is irradiated to one recording layer, such recording light is absorbed by the other recording layer(s), too, to cause a structural change; and (2) When recording light is irradiated to one recording layer and a structural change occurs in that recording layer, it invokes a structural change of the other recording layer(s), too.

The present invention has a remarkable effect in preventing the crosstalk of the type (1) and further allows prevention of the crosstalk of the type (2) by selecting materials for the recording layer.

In the present invention, controlling layer A 9 provided on recording lay A 10 has a function of a separating layer preventing the crosstalk as shown in FIG. 4.

The multi-frequency optical storage medium of the present invention was fabricated by forming successively recording layer B 8 and controlling layer B 7 by the LB method. The recording layer A 10 and the controlling layer A 9 were produced in the same conditions as in Example 1.

Although FIG. 4 shows a multi-frequency optical storage medium comprising a laminate of an optical recording medium consisting of the recording layer A and the controlling layer A and another recording medium consisting of the recording layer B and the controlling layer B, it should be understood that any number of such combinations may be laminated to form one multi-frequency optical storage medium.

For the organic dye of the recording layer B, merocyanine dye, DYE-B was used. The structural formula of the dye is as follows:

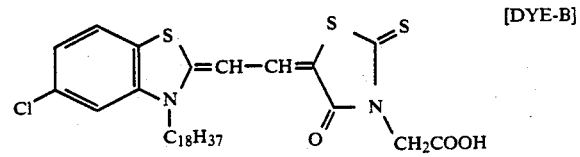

[DYE-B]

Fabrication conditions for the LB recording layer were as follows:

| | |
|---|---|
| Composition | DYE-B/eicosanic acid = 1/1 |
| Sample solution | Mixture of the components in a chloroform solvent in the following concentrations: DYE-B, 1 mmol/liter Eicosanic acid, 1 mmol/liter |
| Aqueous phase (subphase) | Aqueous solution of cadmium chloride ($3 \times 10^{-4}$ mol/liter), pH 6, 20° C. |
| Surface pressure | 25 mN/m |
| Deposition speed | 10 mm/min |
| Number of deposited layers | 4 layers |

The layers comprising DYE-B merocyanine dye fabricated under the conditions as indicated above had an absorption peak in a wavelength of 610 nm due to the J aggregation. The absorption peak due to the DYE-B j aggregation is sufficiently far from that due to the DYE-A J aggregation giving no influence of the crosstalk.

Fabrication conditions for the LB controlling layer B are indicated hereunder. After fabricating a recording layer, a controlling layer was successively formed. Under the indicated conditions, formation of the LB film of a mixture of eicosanic acid and polymethylmethacrylate (PMMA) was performed:

| | |
|---|---|
| Composition | Eicosanic acid/PMMA = 1/2 |
| Sample solution | Mixture of the components in a chloroform solvent in the following concentrations: Eicosanic acid, 1 mmol/liter PMMA, 2 mmol/liter |
| Aqueous phase (subphase) | Distilled water, pH 5.5, 20° C. |
| Surface pressure | 25 mN/m |
| Deposition speed | 10 mm/min |
| Number of deposited layers | 20 layers |

The multi-frequency optical storage medium of the present invention allowed excellent recording using a laser beam of a wavelength of 700 nm and 510 nm for recording onto the recording layers A and B, respectively, without any crosstalk. Each controlling layer formed on each recording layer afforded stable recording as well as prevention of erroneous erasure of the recorded information at the time of reading out. It was possible, moreover, to prevent the recording layer A from producing crosstalk with the recording layer B by using the controlling layer A as a separating layer.

What is claimed is:

1. An optical storage medium comprising a recording layer containing organic dye molecules which allows recording due to change in the molecular structure or molecular aggregate structure induced by irradiation with light, and a controlling layer stable against change in molecular structure or aggregate structure of molecule induced by recording light or reading light provided on said recording layer for controlling the recording sensitivity of said recording layer, wherein the controlling layer is made of a material selected from the group consisting of fatty acids, fatty acid esters, fatty acid metal salts, aliphatic amides, aliphatic alcohols and acrylic polymers.

2. An optical storage medium according to claim 1, wherein the recording layer of said storage medium is formed by using the Langmuir-Blodgett technique.

3. An optical storage medium according to claim 1, wherein the controlling layer of said storage medium is formed by using the Langmuir-Blodgett technique.

4. A multi-frequency optical storage medium comprising a plurality of an optical recording medium consisting of a combination of a recording layer containing organic dye molecules selected from the group consisting of cyanine, merocyanine and squarylium which allows recording due to change in the molecular structure or molecular aggregate structure by irradiation with light, and a controlling layer provided on said recording layer for controlling the recording sensitivity of said recording layer so as to control the recording sensitivity of said optical recording medium, said controlling layer serving as a separating layer which separates said optical recording media from one another, said optical recording media being allowed to record independently by irradiating with lights of different wavelengths, wherein the controlling layer is made of a material selected from the group consisting of fatty acids, fatty acid esters, fatty acid metal salts, aliphatic amides, aliphatic alcohols and acrylic polymers.

* * * * *